(No Model.)
S. WALES.
TOOL HANDLE.
No. 281,418.        Patented July 17, 1883.
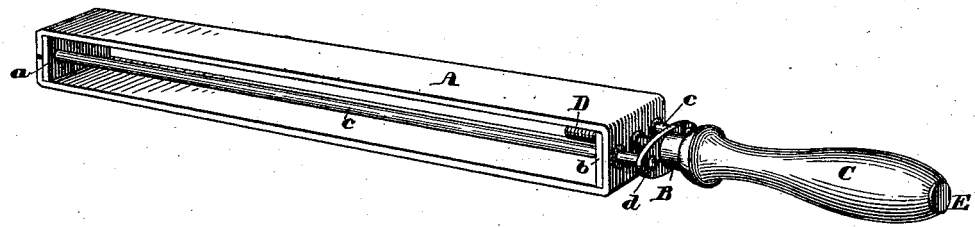
Fig. 1.
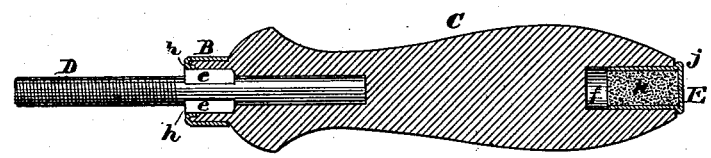 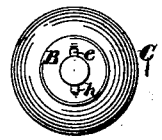
Fig. 2.      Fig. 3.
 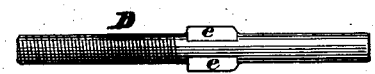 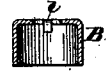
Fig. 5.     Fig. 8.     Fig. 7.
 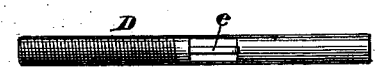 
Fig. 4.     Fig. 9.     Fig. 6.
Witnesses:
E. A. Hemmenway
Walter S. Lombard
Inventor:
Sigourney Wales,
by N. C. Lombard
Attorney.

UNITED STATES PATENT OFFICE.

SIGOURNEY WALES, OF CAMBRIDGE, MASSACHUSETTS, ASSIGNOR TO WILLIAM C. HOWARD, OF NEW YORK COUNTY, NEW YORK.

TOOL-HANDLE.

SPECIFICATION forming part of Letters Patent No. 281,418, dated July 17, 1883.

Application filed March 19, 1883. (No model.)

*To all whom it may concern:*

Be it known that I, SIGOURNEY WALES, of Cambridge, in the county of Middlesex and State of Massachusetts, have invented certain new and useful Improvements in Handles for Razor-Strops and other Articles, of which the following, taken in connection with the accompanying drawings, is a specification.

My invention relates to the construction of handles for razor-strops and other articles, and especially to that class of handles which are subjected to a torsional strain when in use.

It has been found to be somewhat difficult to secure wooden handles to tools in such a manner that they will successfully resist a heavy torsional strain applied thereto for any considerable time, and especially is this true when the shank to which the wooden handle is to be secured is necessarily of comparatively small diameter, as in the case of the screw-shank of the razor-strop, illustrated in the drawings, and still more especially when the wooden handle is finished by japanning, occasioning the subjecting of the wood to several successive bakings at a high temperature, which has the effect of partially charring or destroying the life of the wood, so that it would crumble or disintegrate when the torsional strain was applied thereto, and thus permit the handle to turn upon the shank or tool that should be turned thereby. To remedy this difficulty a pair of wings have been formed upon the screw-shank of the razor-strop handle, which projected radially from said shank and were driven endwise into the wooden handle; but this has proved to be only partially successful in remedying the evil.

The primary object of my invention is the overcoming of this difficulty; and it consists in the combination, with a tool or other shank having one or more radially-projecting wings, of a wooden handle, a capped ferrule arranged to surround and inclose a portion of said handle, and cover the end of said handle, except an opening in its center of a diameter just sufficient to permit the free passage of the unwinged portion of the shank, and one or more slots radiating from said central opening, each formed by cutting two radial incisions from said central opening outward and turning the tongue of metal between said incisions inward without severing it, as will be more fully described.

Figure 1 of the drawings is a perspective view of a razor-strop with my invention applied thereto. Fig. 2 is a central longitudinal section of my improved handle detached from the strop, drawn to an enlarged scale. Fig. 3 is an elevation of the shank end of the handle. Figs. 4 and 5 are respectively a plan and central longitudinal section of the ferrule as it is when applied to the wooden handle and before the shank has been inserted. Figs. 6 and 7 are similar views of the same ferrule as it appears after having been in use upon a handle having a winged shank set therein. Figs. 8 and 9 are elevations of the winged screw-shank.

A is an endless belt of leather, stretched around the plates $a$ and $b$, the former being firmly secured to the ends of the rods $c\ c$, and the latter being movable thereon for the purpose of straining said belt to take up the slack or stretch of the same. The opposite ends of the rods $c\ c$ are firmly secured in the plate $d$, against which the ferrule B of the handle C bears while the threaded end of the shank D works in a female thread in the plate $b$, all in a well-known manner. The shank D has formed near the middle of its length one or more wings, $e\ e$, which project beyond the periphery of the main body of said shank, and that portion of said shank which is to project beyond the end of the handle when applied thereto has formed thereon a male screw-thread, as shown in Figs. 8 and 9.

In carrying out my invention I turn the handle C to the desired shape and form in one end thereof the cylindrical chamber $f$, and in the opposite end a hole to receive the shank D, and apply thereto the ferrule B in the form shown in Figs. 4 and 5, and then drive the shank D into the handle to such a depth that the wings $e\ e$ are completely embedded in said handle, as shown in Fig. 2, the wings $e\ e$ in passing having forced portions of the cap of the ferrule B inward, as shown at $h\ h$, and formed the slots $i\ i$ in cap of the ferrule B, as shown in Figs. 3 and 8. By this arrangement and method of applying the shank D to the handle I obtain a secure attachment of the handle to shank, not liable to be displaced by any fair usage.

What I claim as new, and desire to secure by Letters Patent of the United States, is—

The combination of a tool-handle, a capped ferrule applied thereto and inclosing a portion of one end thereof, and covering the same except a central opening, and one or more slots radiating from said central opening, and one or more tongues of metal turned inward therefrom, as set forth, and a shank or tool having one or more radiating projecting wings, substantially as described.

In testimony whereof I have signed my name to this specification, in the presence of two subscribing witnesses, on this 17th day of March, A. D. 1883.

SIGOURNEY WALES.

Witnesses:
E. A. HEMMENWAY,
WALTER E. LOMBARD.